United States Patent
Warner et al.

(10) Patent No.: US 8,505,027 B2
(45) Date of Patent: Aug. 6, 2013

(54) ELECTIVE DATA SHARING BETWEEN DIFFERENT IMPLEMENTATIONS OF A SOFTWARE PRODUCT

(75) Inventors: Douglas K. Warner, Bozeman, MT (US); J. Neal Richter, Belgrade, MT (US); Stephen D. Durbin, Bozeman, MT (US)

(73) Assignee: Oracle OTC Subsidiary LLC, Redwood Shores, CA (US)

( * ) Notice: Subject to any disclaimer, the term of this patent is extended or adjusted under 35 U.S.C. 154(b) by 845 days.

(21) Appl. No.: 11/315,413

(22) Filed: Dec. 22, 2005

(65) Prior Publication Data

US 2007/0150856 A1 Jun. 28, 2007

(51) Int. Cl.
*G06F 3/00* (2006.01)
*G06F 7/00* (2006.01)
*G06F 15/167* (2006.01)

(52) U.S. Cl.
USPC ............ 719/312; 707/705; 707/783; 709/213

(58) Field of Classification Search
USPC ................. 715/777; 709/227, 205; 717/116; 455/558; 719/319
See application file for complete search history.

(56) References Cited

U.S. PATENT DOCUMENTS

| | | | |
|---|---|---|---|
| 5,737,605 A * | 4/1998 | Cunningham et al. | 719/312 |
| 5,884,316 A * | 3/1999 | Bernstein et al. | 709/213 |
| 6,952,717 B1 * | 10/2005 | Monchilovich et al. | 709/205 |
| 7,246,135 B2 * | 7/2007 | Reid | 719/312 |
| 7,587,721 B2 * | 9/2009 | Schmidt et al. | 719/312 |
| 7,734,607 B2 * | 6/2010 | Grinstein et al. | 707/705 |
| 7,805,415 B1 * | 9/2010 | Flesher et al. | 707/783 |
| 2002/0091836 A1 * | 7/2002 | Moetteli | 709/227 |
| 2003/0093487 A1 * | 5/2003 | Czajkowski et al. | 709/213 |
| 2005/0025303 A1 * | 2/2005 | Hostetler, Jr. | 379/265.02 |
| 2005/0257197 A1 * | 11/2005 | Herter et al. | 717/116 |
| 2006/0205434 A1 * | 9/2006 | Tom et al. | 455/558 |
| 2006/0206834 A1 * | 9/2006 | Fisher et al. | 715/777 |
| 2006/0230118 A1 * | 10/2006 | Jwo | 709/213 |
| 2010/0030784 A1 * | 2/2010 | Lobo et al. | 707/783 |
| 2011/0071996 A1 * | 3/2011 | Fisher et al. | 707/705 |

OTHER PUBLICATIONS

"Global Growth of Open Acess Networks: from WarChalking and Connection Sharing to Sustainable Business", Roberto B attiti, 2003, pp. 1-10.*
"An Object-Oriented Approach to Schema Integration and Data Mining in Multiple Database", Hiaihong Dai, 1998, pp. 1-10.*
"Creating Other Schema Objects", Oracle, 2004, pp. 1-22.*
"How to Share Work on Shared Objects in Design Database", Ranft, 1990, pp. 1-9.*

* cited by examiner

*Primary Examiner* — Tuan Dao
(74) *Attorney, Agent, or Firm* — Kilpatrick Townsend & Stockton LLP

(57) ABSTRACT

The present invention is directed to a system and method for selectively sharing data between different implementations of the same software program in a network environment. The program implementations are otherwise independent with each executing its own private memory space in a single computer or on multiple computers in the network. The present invention enables a first implementation of a program to borrow or utilize data collected, derived or otherwise utilized by a second implementation of the same program.

23 Claims, 9 Drawing Sheets

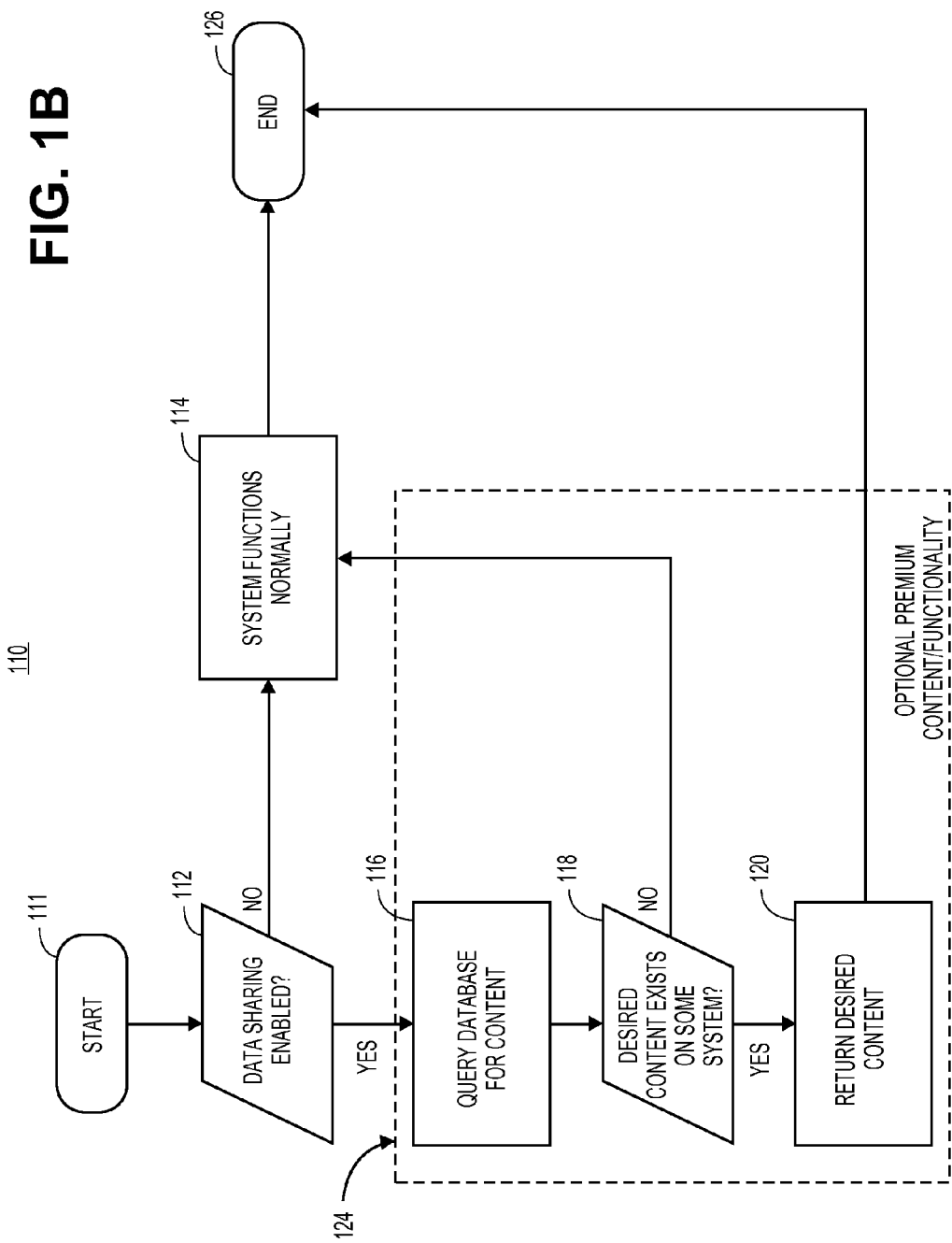

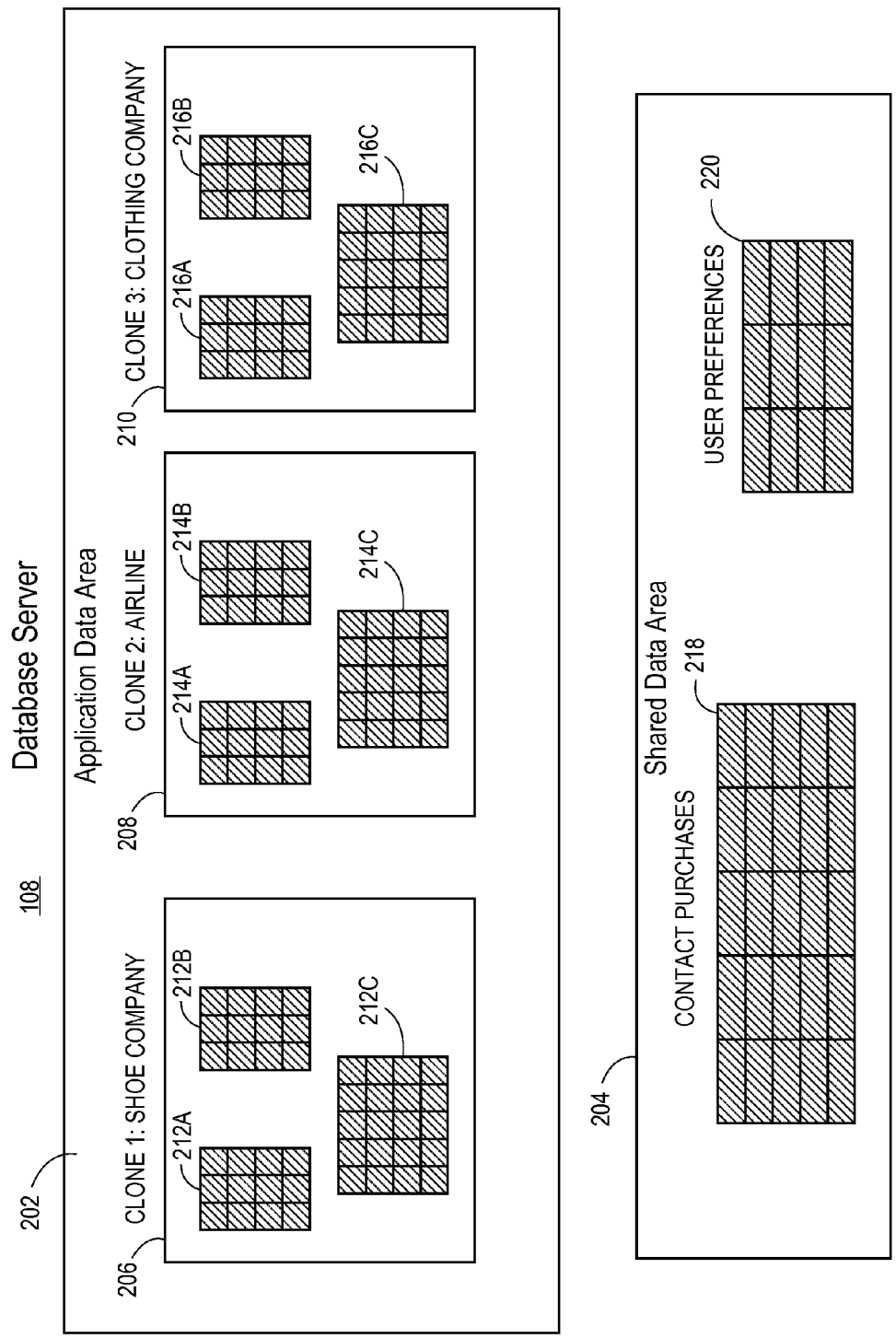

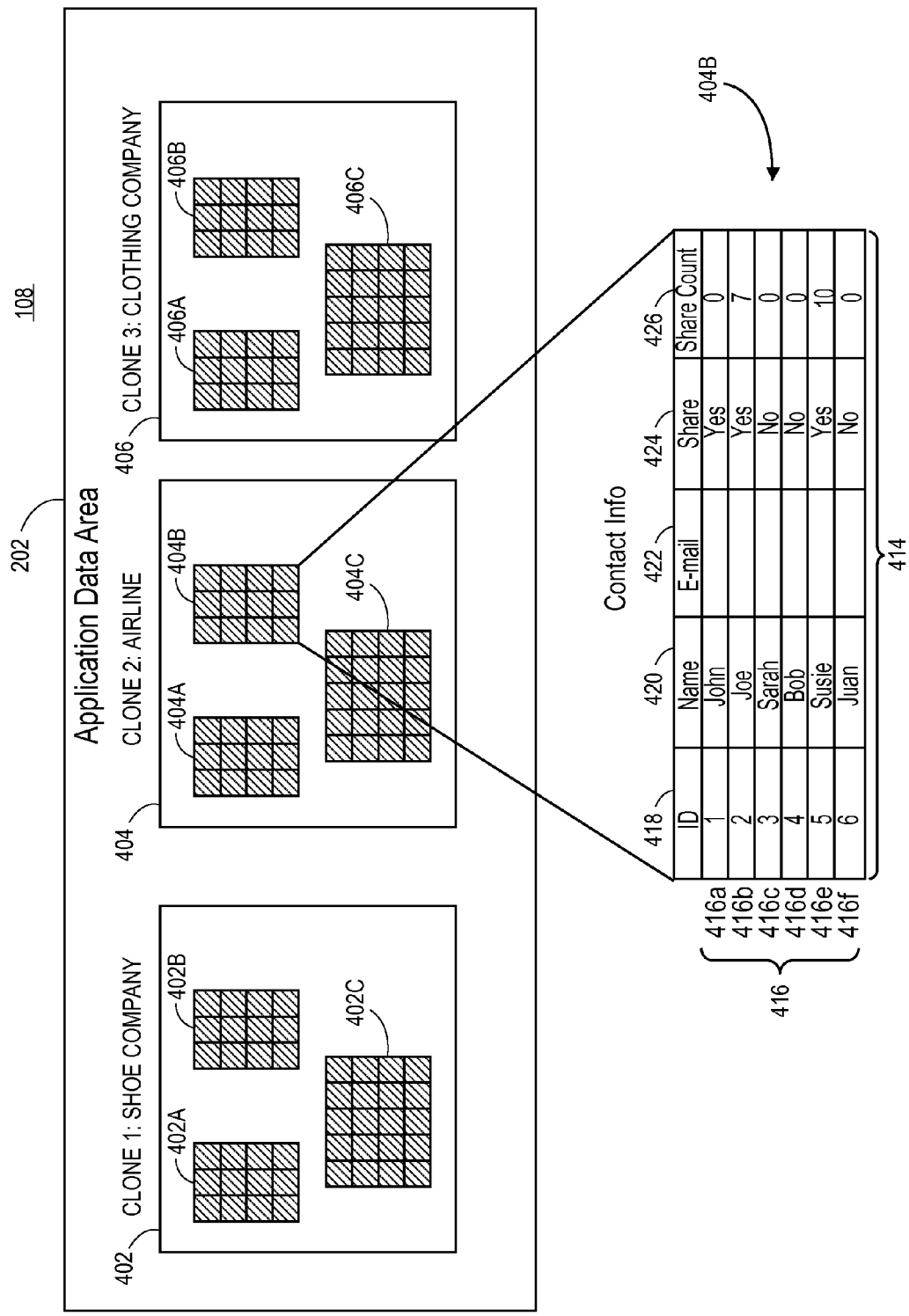

ELECTIVE DATA SHARING BETWEEN DIFFERENT IMPLEMENTATIONS OF A SOFTWARE PRODUCT

The present invention is directed to a system and method for selectively sharing data between different implementations of the same software program in a network environment. The programs are otherwise independent each executing its own private memory space in a single computer or on multiple computers in a network.

BACKGROUND

Software programs and systems are traditionally siloed. In other words, each application program maintains a memory space and its own relevant data store, thus maintaining a "local copy" of any data it utilizes. This paradigm for computer applications has been historically dictated by the disconnected nature of the computer system. The "local copy" has also been helpful in preserving the privacy of the data. However, having this private data has also prevented the sharing of data that could improve the functionality of individual program implementations.

The world wide web and other distributed file sharing systems or applications for content such as music, documents, etc. present one aspect of data sharing, albeit necessary for those applications to function normally. A system or method that would allow clones or other independently executing copies of a particular program to share data and or information that would be advantageous and that would otherwise be duplicative across similar implementations of the program has many advantages.

Traditionally, in networked or hosting environments, multiple sites running an application program collect and utilize a vast amount of data, which is kept segregated to each application program copy, implementation, or site. These individual applications could potentially benefit from leveraging the functionality that is provided by one application or one implementation, to aid another implementation of the application. Heretofore, different methods of aggregating information and centralizing information for use by multiple systems have been implemented. However, these methods and systems do not contemplate or enable two identical pieces of software that are intended to run separately as standalone programs, to share key pieces of data such that the software programs would run better.

Prior art systems shared information between disparate, distinct applications that had no common shared infrastructure and thus presented communication difficulty.

SUMMARY OF THE INVENTION

The present invention is directed to a system and method for sharing data between identical software programs, which are designed to run independently in a standalone mode and that may be executing in a different client environment or hosted on a single system. The present invention enables a first implementation of a program to borrow or utilize data collected, derived or otherwise utilized by a second implementation of the same program. In a multi-tenant hosted architecture for example, each application has a structured aspect and specific fields that are common to the other applications albeit in separate databases. Stated another way, the schema may be the same in two or more different databases.

DESCRIPTION OF THE DRAWING FIGURES

The present invention is further described with reference to the accompanying drawings, which show various constructions and implementations of the present invention. However, it should be noted that the invention as disclosed in the accompanying drawings is for illustrative purposes only. The various elements and combinations of elements described below and illustrated in the drawings can be arranged and organized differently to result in constructions which are still within the spirit and scope of the present invention. The accompanying drawings form a part of the specification and are to be read in conjunction therewith and in which like reference numerals are used to indicate like parts in the various views:

FIG. 1B is a flow chart illustrating exemplary steps for the Shared Content Model of FIGS. 2A, 2B and 3;

FIG. 2A is a block diagram illustration of the database server from the architecture of FIG. 1A, illustrating a Shared Content Model embodiment of the present invention, in which there is an application data area having a database for each cloned application, and there is a shared data area having multiple databases with content that can be shared by the cloned applications;

Figure 1A:
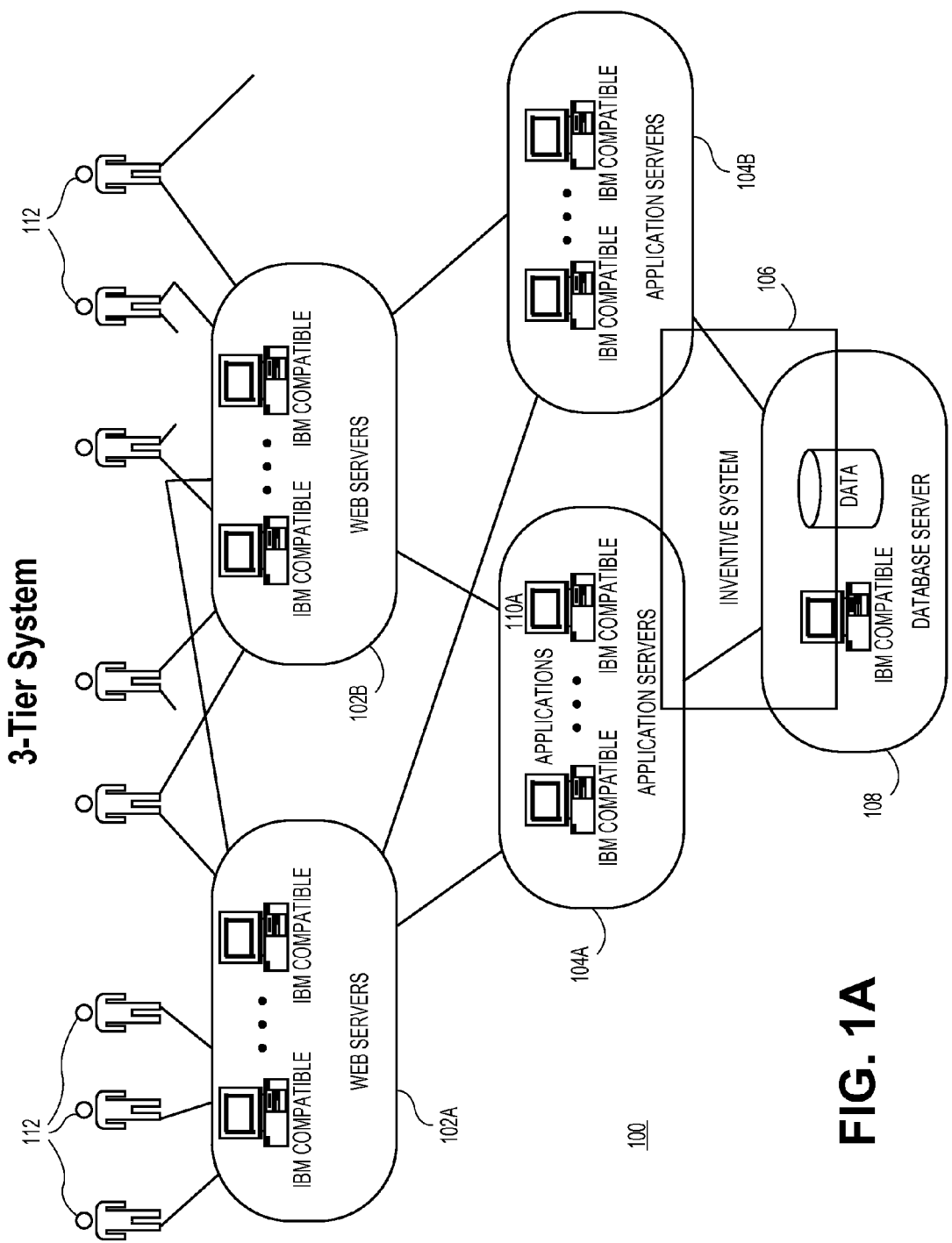
FIG. 1A is a diagram of an illustrative 3-Tier architecture in which the present invention may be implemented.
Figure 4A:
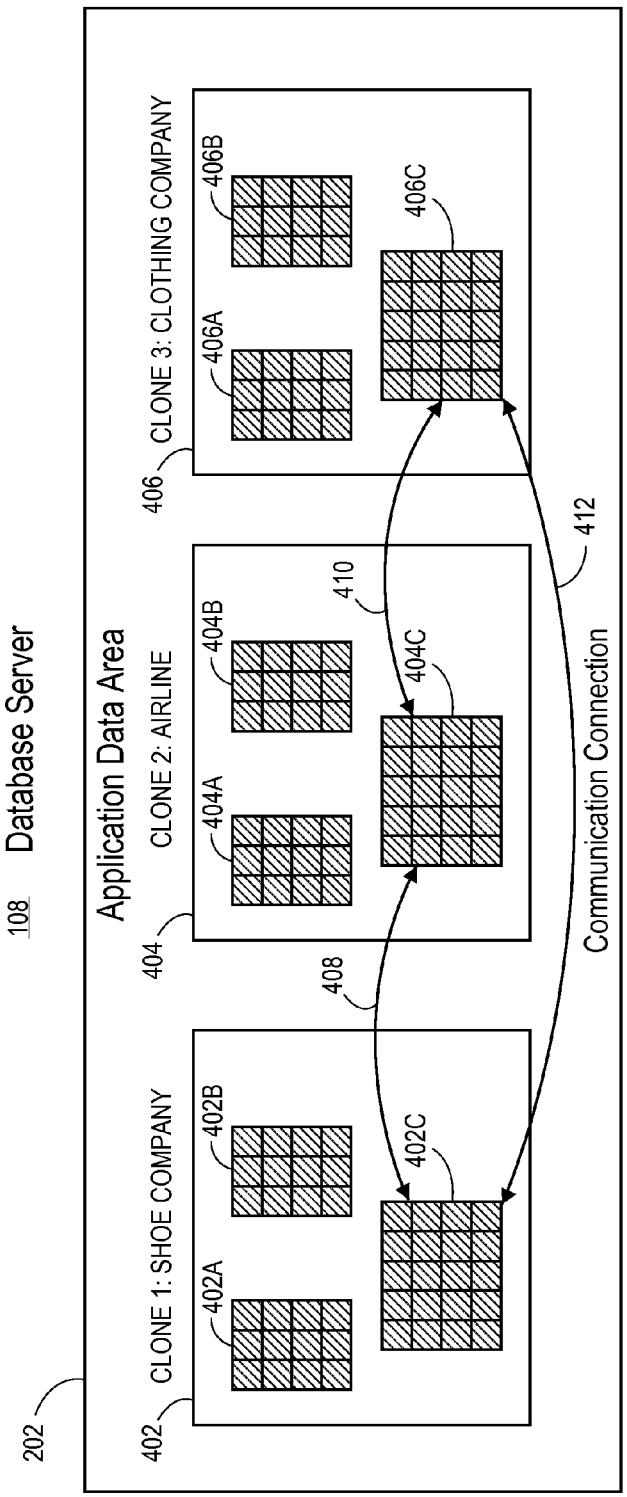
FIG. 4A is a block diagram illustration of the database server from the architecture of FIG. 1A, illustrating a Table Access Model of the present invention, in which there is a database for each cloned application, and there is direct communication/access between similar tables from one database to another.
Figure 5:
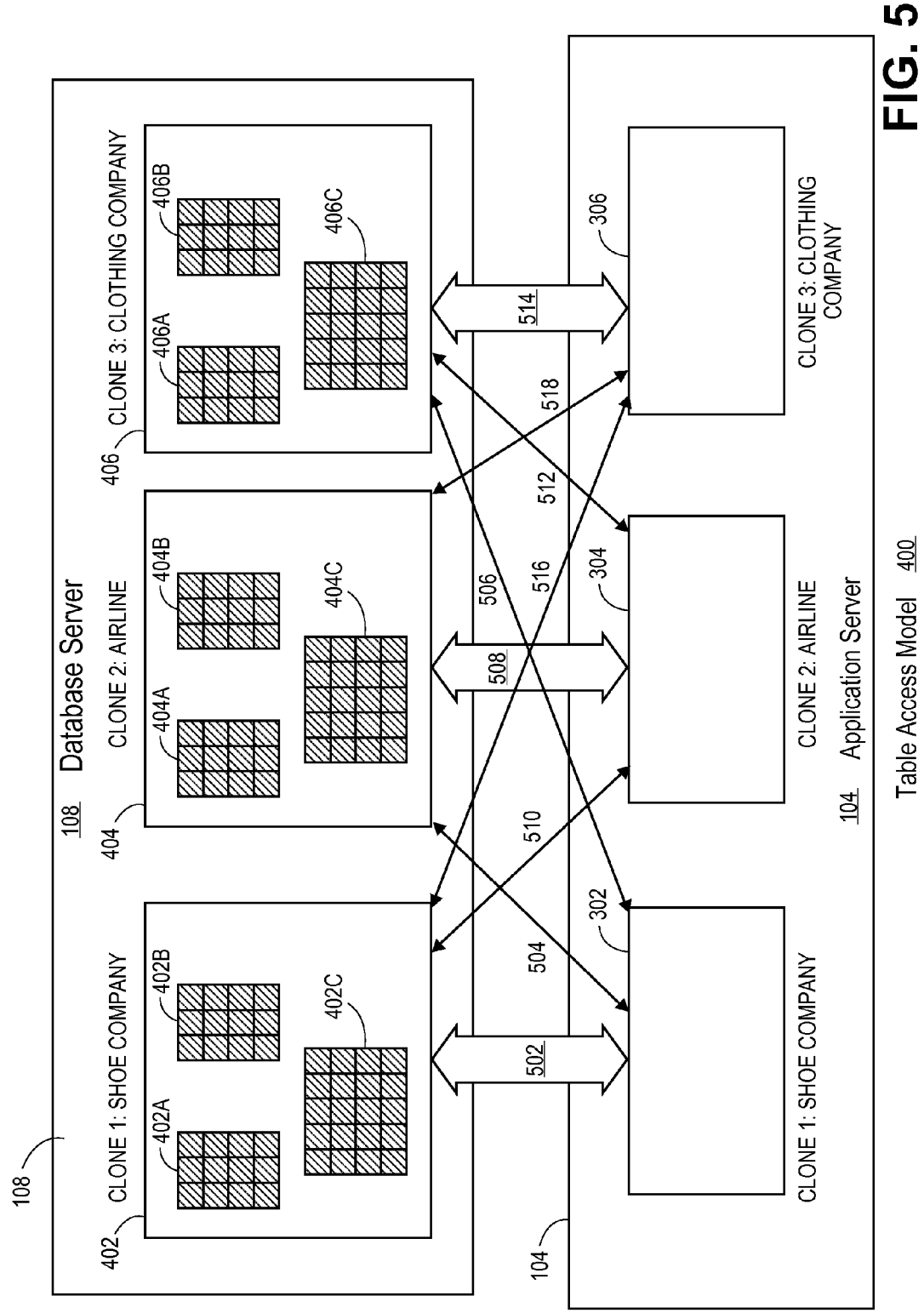

FIG. 4B is a block diagram illustration of the database architecture of FIG. 1A, illustrating an exemplary table structure for the Table Access Model of FIG. 4A in which there is a field within each table that enables the classification of particular records as being shareable; and FIG. 5 is a block diagram illustrating the interaction among the Database Server and the Application Server based on the Table Access Model of FIGS. 4A and 4B wherein, each application program clone has access to the database and data tables of the other application program clones.

DETAILED DESCRIPTION

The present invention is directed to a system and method for selectively sharing data between different implementations or executions of the same software program in a network environment. A single application that traditionally operates in isolation as a standalone program on a client computer or a hosted application in a server environment is cloned and provided with data sharing capabilities in the present invention. In the preferred embodiment of the present invention, the single application program is cloned for use by different organizations resulting in N clones of the application. Each cloned application is then made aware of the existence of the other cloned applications, such that each cloned application is able to share specific information that would increase the functionality of each of the other systems. The sharing is transparent to end-users, their experience would be that of the original single application, albeit with lower maintenance and higher functionality.

The present invention is preferably implemented within a multi-tenant hosted model of internet software delivery, which is described with reference to FIGS. 1-5. One skilled in the art to which the present invention pertains recognizes that the objectives of the invention can be accomplished through variations of the techniques, systems and methods described herein. Each cloned application is separable and severable from the other clones, and depending on the implementation would have distinct access points. An application as described herein is not a monolithic application with a single access point that allows people to share data. In the cloned application environment of the present invention an individual version of the cloned application can be changed or upgraded independent of the other clones. The individual cloned application runs separate of other clones, and without any interaction. It should be understood that such variations are contemplated by and within the scope of the present invention. Furthermore, it is understood the descriptions provided herein are merely exemplary and should not in any way be construed to limit or otherwise define the scope of invention.

In a multi-tenant hosted model, identical application programs for multiple organizations or purposes, which are designed to operate in isolation are hosted within a single system. Such a system may be a network environment having multiple servers, a multi-processor environment or a single computer system having a multi-tasking operating environment. In any case, each application program operates in conjunction with a set of data items that are unique to a particular implementation. The application programs are co-hosted, residing with respect to the operating or network environment on a single system but are otherwise independent, with each application executing in its own private memory space, in a single computer or on a single processor or virtual machine.

An example of a multi-tenant system for enabling such data sharing comprises a web server (or load balancing suite of web servers), an application server(s) and a database server (s). These systems can exist on a single computer hardware platform or may be distributed across multiple platforms in a network. The preferred embodiment of the present invention is best implemented and described with reference to a 3-tiered architecture, such as illustrated in FIG. 1A. However, it should be noted that the model of the present invention is also applicable to a 1, 2 or N tier system. The multi-tier hosting model is a well known and efficient means for controlling hardware usage and costs by optimizing the number of computers serving a given usage load at any point in time. Through proper configuration, the system and, the suite of computers can efficiently balance all system load and eliminate wasteful situations where hardware is left idle. Further, it should be understood that in the various servers, a separate file could be read as if it were a database on the data base server and that file could be shared just as well as the fields within the database on the database server or other servers.

As shown in FIG. 1A, a 3-Tier system architecture 100 in which the present invention may be implemented, generally comprises one or more web servers 102A, 102B collectively referenced as web servers 102 one or more application servers 104A, 104B—(Application Servers 104); and one or more database servers 108.

Web server 102 is the communication portal for the outside world/end-users 112 to interact with the system 100. A single Web server 102 may be implemented on a single computer system. However, as would be understood by one skilled in the art, multiple web servers 102 may be implemented on one computer system.

Interaction with web server 102 is generally provided through one or more web sites having one or more web pages for user interfacing. The web pages provide the user front end for functions and operations some of which may, run on the web server 102, invoke applications on the application servers 104, and provide or obtain information from database server 108. There could be distinct web sites for different companies, products or any other grouping that is desired by a web site owner. For the purpose of illustration, the present invention will be described with reference to distinct web sites for a shoe company, an airline, and a clothing company. A web server 102 may operate in an isolated mode and host a single web site. Alternatively, multiple distinct web sites may be served by one or more web servers 102. In the appropriate case, the multiple web servers 102 may operate in unison to balance incoming load across multiple computer systems or machines. Irrespective of the particular configuration of the web server 102 or web sites, end users 112 communicate with the system 100 through a variety of input and feedback devices with the web sites, and web servers 102. As illustrated in a 3-Tier, system 100 the web servers 102 may be connected to one or more application servers 104.

The application servers 104 host and provide software programs, that provide functions which are of interest to the end-user. Such a software program for example, might be a Customer Relations Management (CRM) system that provides sales automation, service automation and marketing functionality. The functional operations of the CRM and the associated logic for performing those functions are programmed into applications that are executed in the application server 104. For example, in a sales transaction the logic that might cause the CRM to compute order totals, identify an appropriate sales tax and determine shipping options for a particular order, may be implemented by an application program that executes on the application server 104. As would be understood by one skilled in the art, the application program may execute across one or more application servers 104.

Ordinarily, each application server 104A, 104B may serve multiple web servers 102, thus consolidating the operating environment for the cloned application. One skilled in the art recognizes that the retention and/or the retrieval of information, i.e. the data store used by an application such as the CRM system typically requires one or more databases. A database retains the content for each application and may contain for example, data for a shoe store, an airline, a tour company, and a health agency, as well as perhaps a clothing store, an ice cream company, and a computer hardware company. As suggested above, one of the concepts herein contemplates separate/different databases for various types of businesses, but with each database having at least a portion thereof with the same or identical schema. One or more of such databases may reside in a database server 108. A database may comprise one or more data tables, security roles, indexes, triggers, and scripts among other things. The database server 108 executes and manages all of the functions associated with the various components of the database.

In the preferred embodiment of the present invention, the application severs 104, share a common database server 108. However, it is understood that there may be multiple database servers 108, each of which may then be accessed by any one or more application servers 104 as needed. The system and method of the present invention may be conceptualized as residing and communicating between an application layer and a database layer of the multi-tiered environment 100. This concept is illustrated and identified as inventive system 106 in FIG. 1A. System 106 encompasses configuration, schemas, communication links, data access, and logic that will be described in more detail.

The system and method of the present invention is directed to having multiple clones of an application program access and share data from one another to leverage each other and thus provide improved performance. The access and sharing of data on the database server 108 is facilitated by the inventive methodology of the present invention, components of which may be conceptualized to exist on and between the application servers 104 and the database server 108, and operate as a smart data interface.

The functionality of a data interface, according to the system and method of the present invention is described with reference to exemplary steps shown in a data interface flow chart 110 of FIG. 1B. One skilled in the art would recognize that the steps set forth in the flow chart 110 may be implemented in a variety of ways and may exist as part of a single application program, database script or other methods for implementing/executing logic in a computing environment. Even further, it would also be understood that such steps may be implemented on one or more logic implementation environments, without departing from the scope of the present invention.

In operation, a cloned application program according to the present invention, such as the previously described CRM application may have a data interface which may be implemented as specific functions, routines, libraries, executable programs or other groupings of instructions, for interacting with a data store, such as the database server 108. When the data interface is invoked at step 111, a determination must first be made regarding the availability of data sharing at step 112. If data sharing is not enabled, then the data interface program will continue its normal operations, such as accessing what might be termed the private data store for the application, at step 114. Alternatively, if data sharing is enabled, then processing will proceed with what may be termed premium content functionality 124. The premium content functionality 124 are steps and processes wherein access is provided to the data store of another cloned application and potentially the data store of another company. The premium functionality includes a query step 116, a locating step 118, and a data return step 120.

To obtain the data that is sought, a database on the database server 108 must be queried, and this occurs at step 116. It should be understood that this query is not limited to just the private data store, but instead spans the databases of all application clones. Next, if it is determined that the data does not exist on any one of the systems, then processing is transferred back to step 114 for normal processing. On the other hand, if the data does exist on some system, then at step 120, such data is returned to the data interface, for further processing and the operation is terminated at step 126.

The flow chart 110 of the data interface has been greatly simplified for illustrative purposes. It is also the case that the described implementation is only one aspect of what is provided by the present invention. In another aspect of the present invention additional steps that address a different sharing paradigm or model and issues of data privacy are implemented as part of the optional premium content functionality 124. This alternate model is illustrated in FIG. 1C and described with reference thereto.

Figure 1C:
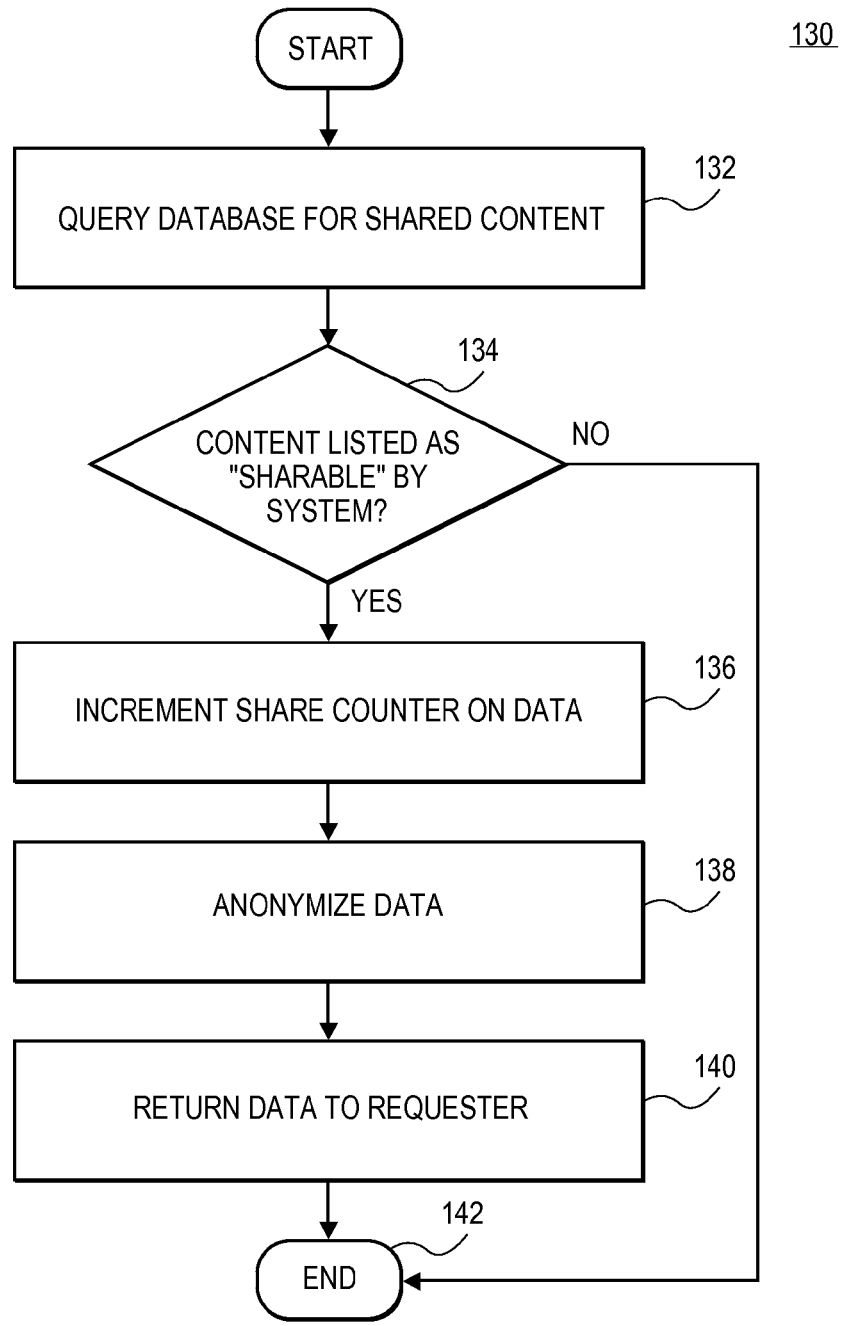
FIG. 1C is a flow chart illustration exemplary steps for the Table Access Model of FIGS. 4A, 4B and 5.

FIG. 1C illustrates a data share flow 130. In the data share flow 130, a database is queried for shared content information in a similar manner to what was previously described in FIG. 1B. At step 134, if the desired content is neither listed as shareable or is otherwise unavailable, processing proceeds to the end step 142. Conversely, if the desired content is available and listed as shareable, then a few more actions need to be performed before such data is released. Further details regarding such actions, which include data share tracking, data access and data anonymizing will be discussed later in this document. Suffice to say for now that at step 136, a share counter is incremented to capture and record the sharing event. Next, the data that is to be released is anonymized for privacy purposes or other reasons pertaining to confidentiality of the content data, at step 138. The content data is then made available to the requesting application at step 140 and the premium content functionality ends at step 142.

Any application where data sharing is performed needs to consider data privacy and data security. Depending on the particular data that is shared, and the sharing approach, a number of levels of privacy schemas are available. The simplest is no consideration of privacy. This would be most applicable when competitive information is not visible. The next level of privacy that would apply is where there is manual evaluation and selective screenings for privacy, by employees of the software vendor. Next is some level of automated privacy that is handled by the system, through such measures as having tables to record which companies are allowed to share information, and which information items can be shared. In this scenario, various divisions of a company might choose to share information, but disallow sharing outside of the company.

Alternatively, sharing might be acceptable outside a company, as long as it is not with a competitor. These globally maintained tables might suffice to manage sharing, or more control could be afforded with locally maintained permissions within a single data store for each item that could possibly be shared. A Sharing Management console would allow local administrators to specify sharing permissions. Finally, partial or full anonymization could be handled by the system to create a double-blind process for the information sharing. Sharing methods could be inherent in the system functionality. This means that the sharing always occurs with an appropriate privatization schema as described above on an equal basis, or is selectively performed. Selective sharing could be through a pay service with the software, where only those who pay for the sharing service receive that functionality. In this mode, each system remains fully independent with as much functionality as traditionally existed in this software. The shared data provides increased functionality not otherwise available, and is thus accessible as a premium service of the software.

Similarly, the sharing could be tracked by the system so that an incentive and reputation system is built around the sharing—sharing data gains the sharer credits, and sharing reputation is built around the quality of the content that was shared (as evaluated on by those receiving the shared information). Alternatively, a simple schema would allow administrators of individual data stores to set prices for sharing specific data. This is explained further in Example 3, Contacts.

As described earlier, numerous configurations or options exist for the storage, security and access to data within the database server 108. Two embodiments of the present invention of data sharing and access for within the database server 108 will be described herein. The first embodiment is designated a Shared Content Model 200 and is described with reference to FIGS. 2A, 2B, and 3. The second embodiment is designated a Table Access Model 400 and is described with reference to FIGS. 4-5.

Turning initially to FIG. 2A, the first embodiment designated a Shared Content Model 200, pertains to having an application data area 202 with a database 206, 208, 210, for each one of three cloned applications. The second embodiment of data sharing designated a Table Access Model 400 includes as mentioned above, a database for each cloned application, and there is direct communication/access between similar tables in one database to the counterpart table in another database.

Turning initially to the first embodiment and FIG. 2A, the database server 108 in this embodiment comprises the application data area 202 and a shared data area 204. Generally and as shown, there is a portion of share data area 204 reserved and utilized for each application that executes on the application servers 104 of FIG. 1. Returning to FIG. 2A, and to the earlier described exemplary systems, namely the shoe company, the airline, and the clothing company, there is a specific database within the application data area 202 for each one. Therefore, and as shown, there is a shoe database 206 for the first cloned application that is utilized for a shoe company; an airline database 208 (for a specific airline) for the second clone; and a clothing database 210 (for a specific clothing company) for the third clone.

Consistent with traditional databases, each of the databases 206, 208, 210 includes a schema of at least one or more data tables, which then define at least one or more fields, field types and other identifiers that characterize the data that will be stored within the databases 206, 208, 210. Accordingly, shoe company database 206 includes a first table 212A, a second table 212B and a third table 212C, all collectively referenced as shoe tables 212. Since the airline application and clothing company application are clones of the shoe company application, they also each have an identically defined schema of tables. Thus there are airline tables 214A, 214B, and 214C and clothing tables 216A, 216B, and 216C. Obviously, the data in the shoe company's database versus the data in an airline database and the clothing company's database is distinct data yet because of the commonalities of the system some of the distinct data is appropriately shareable between two or more of the companies.

As previously set forth, the database server 108 also includes a shared data area 204. The shared data area 204, may include one ore more tables that are accessible and shareable by any one of the shoe, airline and clothing application programs. For example, as illustrated in FIG. 2A, a contact purchases table 218 and a user preferences table 220 may be defined in the shared data area 204. As suggested by the table names, either of these tables 218, 220, collectively referenced as shared table 222 provides information that transcends the different cloned applications. A shoe company may well track and utilize information relating to the purchases made by various individuals, as well as information pertaining to people's taste or preferences. Such information would also be relevant and beneficial to an airline or clothing company.

It should be noted that when data is available in the shared data area 204, the original data would continue to exist as a segmented part of the original application, but the shared content model may allow a reference to the data in the shoe company's and the clothing company's data space 214, 216. Similarly, the application server 104 may query the database server 108 not just for the information exclusive to the current status of a company's implementation's data, but also for the data identified as shared. Further, just as the shared data area 204, which is not part of an individual application but exists in the data storage device (database server 108) and is used to keep the shared information, a dedicated application, not part of the original application, may exist on the application server 104 to analyze each data store for potential data worthy of being shared. Alternate approaches may include a single-tenant or even a traditional self-hosted model where the shared data is distributed across all systems, located in distinct locations, or located in a common database having shared item references, assuming that a common database is accessible to all installed systems such as via the web at a site maintained by the software vendor. An aspect of the current invention is the sharing of data among identical software applications, said data being part of the normal, non-shared functionality of said software system.

In one embodiment of the present invention, each of the shared tables 222 is defined to enable identification and cross reference to the clone application from/to which individual records belong.

Figure 2B:
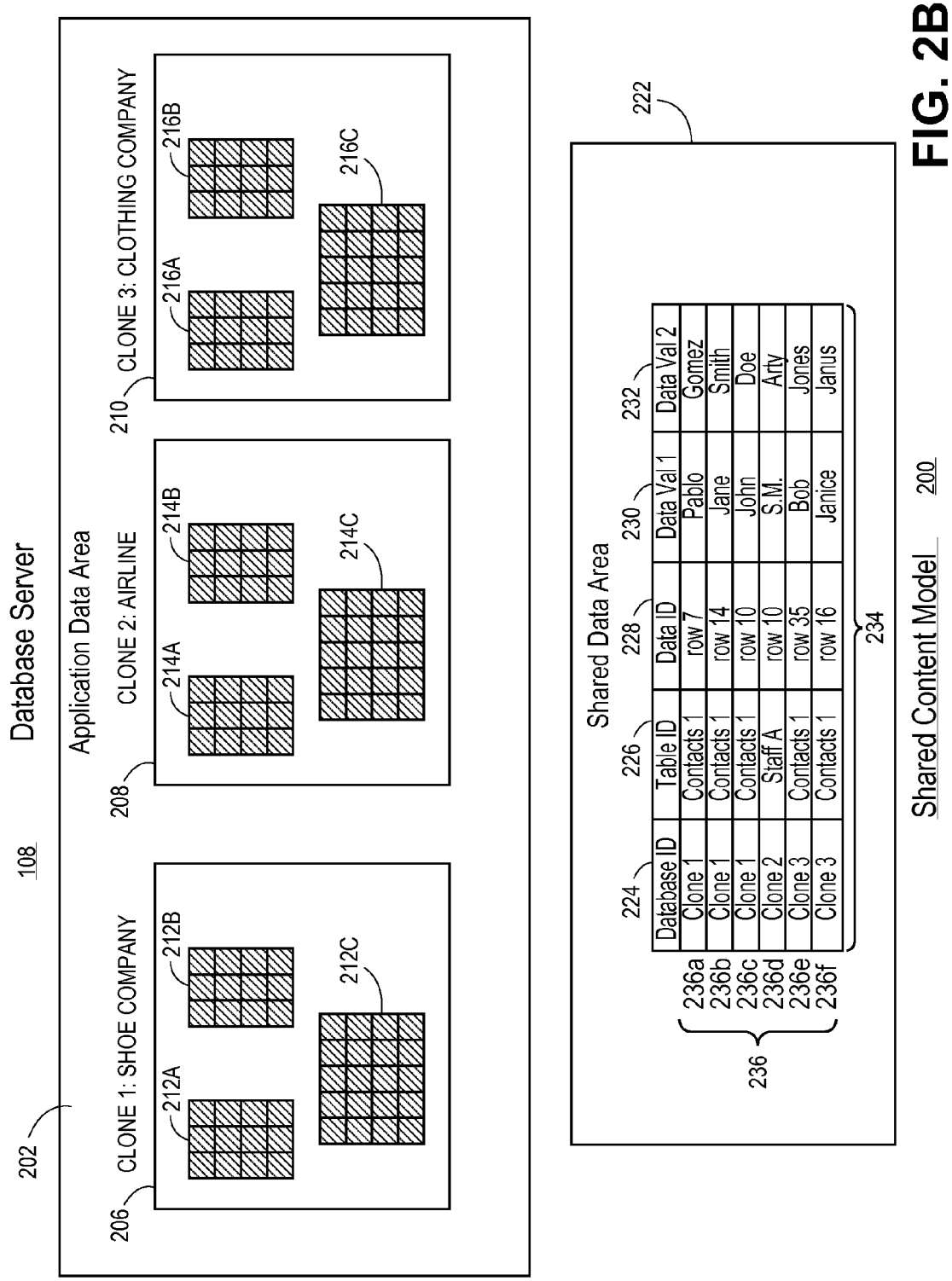
FIG. 2B is a block diagram illustration of the database architecture of FIG. 1A, illustrating another Shared Content Model embodiment of the present invention in which there is a shared data table having individual records that are uniquely identified with a particular cloned application database and data table therein.

As shown in FIG. 2B, a shared data table 222 is defined for the information that is to be shared among the cloned applications. A number of shared fields 234 are defined including Database_ID 224, table ID 226, Data_ID 228, Data_value1 230, Data_value2 232 and so on. Multiple 236a, 236b, 236b, 236d, 236e, and 236f, collectively referenced as share records 236 are created by providing an entry for one or more of the share fields 234, where each record 236a, 236b, 236b, 236d, 236e, and 236f identifies and describes a target database 206, 208, 210, a table 212, 214, 216 within the database 206, 208, 210, a row at which values should be provided, and the actual values for the row.

For example, turning initially to record 236a the Database_ID field 224 as suggested by the name identifies an appropriate one of the application databases 206, 208, 210. In the illustrated example, the record 236A is associated with the database 206 for the shoe company. As previously identified in the application data area 202, the shoe company database 206 is labeled as clone 1. As such the Database_ID 224 field in record 236a has an entry of "Clone 1". Similarly, the Table_ID field 226 identifies a table from the shoe application database 206. One such table is a contacts table 212A as such, the Table_ID field 226 has a value—"Contacts 1". The Data_ID field 228 identifies a unique row—"row 7", in the Contacts table 212A. The Data_Val 1 field 230 identifies a first value—"Pablo" for the associated row—"row 7" of the contacts table 212A. The Data_Val 2 field 232 identifies a second value—"Gomez". The pattern of data for shared records 236 and associated shared fields 234 continues in a similar fashion for all the tables in the shared data area 204 of the database server 108.

Figure 3:
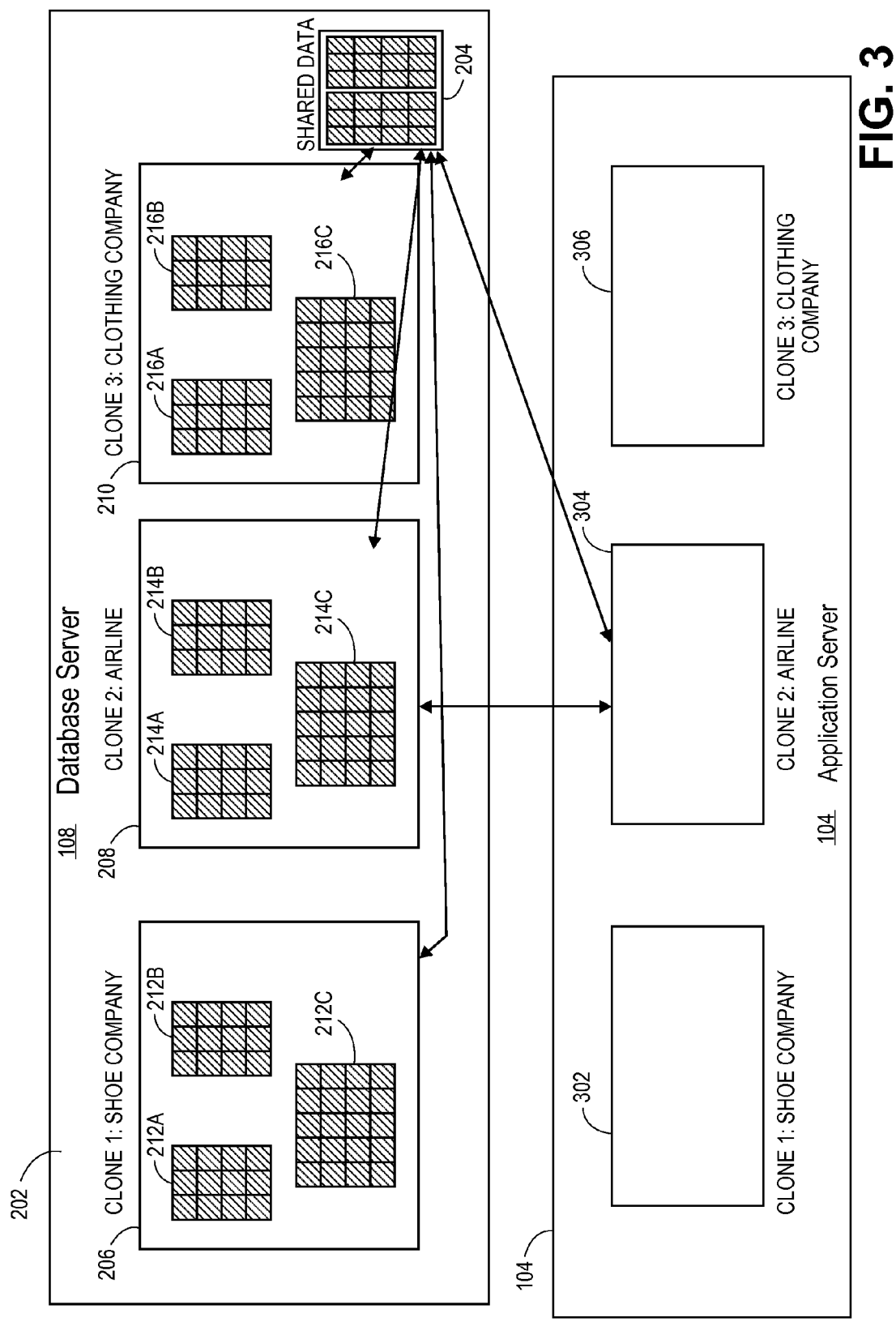
FIG. 3 is a block diagram illustration of components of the database server and the application server from the architecture of FIG. 1A for the Shared Content Model, the application server having multiple cloned applications and the database server having a database for each clone of the cloned applications and a shared database.

Having described the various repositories for data in the Shared Content Model, how the data is accessed and used by the system and method of the present invention is best understood with reference to FIG. 3, which illustrates the database server 108 (FIG. 1A) and an application server 104A (FIG. 1A) interacting in the Shared Content Model 200. As previously described, in the present invention, the application server 104A executes multiple cloned applications 302, 304, 306. Specifically, there is a shoe company application 302, an airline company application 304, and a clothing company application 306. As previously described, each of these applications 302, 304, 306 is a clone of the others. In other words, the logic, the program code and any defined data structures for the applications 302, 304, 306 are identical copies (to distinguish from a monolithic application). The applications 302, 304, 306 are installed and operate as multiple siloed applications on the application server 104A, with each instance having a distinct access point. This is in contrast to a single application program usable by multiple users from a single entry point or a single monolithic application useable by multiple users from multiple access points. As previously set forth, the applications 302, 304, 306 interact with the database server 108 to store or retrieve information.

The database server 108 includes multiple databases 206, 208, 210 and shared tables 218, 220 (in the exemplar embodiment), as previously described with reference to FIGS. 2A and 2B. For each of the cloned applications 302, 304, 306 there is an associated database 206, 208, 210 respectively. Each application 302, 304, 306 interacts and communicates directly with its corresponding database 206, 208, 210 and the tables in the shared area 204, namely contact purchases table 218 and user preferences 220 as shown in the illustrative examples used herein. In this Shared Content Model there is no interaction or cross-communication between the various application databases 206, 208, 210 nor is there any interaction from one application 302, 304, 306 to the application database 208, 208, 210 of another. For example, the shoe company application 302 is associated with and utilizes the shoe company database 206, as such it does not access or interact with either the airline database 208 or the clothing database 210. The shoe company application 302 can and does interact with the shared database 204 to access data in the contacts table 218 and user preferences 220, as can the airline application 304 and clothing company application 306. There is also an interaction and communication between the shared database 204 and each of the application databases 206, 208, 210. Accordingly, an application program 302, 304, 306 can obtain information directly from the tables of its associated database 206, 208, 210, directly from the shared tables 204 or indirectly by reference from the shared tables 204.

The Table Access Model is described with reference to FIGS. 4A, 4B and 5 and represents yet another embodiment of the invention. For clarity and ease of comparison with the previously described Shared Content Model, the Table Access Model will be described in the context of the same application implementations as previously described. In other words, this description of the Table Access Model contemplates an installation in an environment as shown in FIG. 1A and described above, wherein cloned applications are installed for a shoe company, an airline and a clothing company. The end user interface or interaction, as well as the Web servers 102 remain unchanged. However, the implementations of the application servers 104 and database server 108, are configured, programmed and function differently.

Consider initially, the database server 108 shown in FIG. 4A. There is a database for each cloned application and there is direct communication/access between similar tables on the different databases. More specifically, the database server 108 in this model includes, among other things, a shoe company database 402, an airline database 404 and a clothing company database 406, collectively referenced as application databases 402, 404, 408.

Each of the application databases 402, 404, 406 includes a schema that defines at least one table. For example and as illustrated, each of the application databases 402, 404, 406 includes three defined tables that are identical in structure across the databases 402, 404, 406. The shoe company database 402 includes tables 402A, 402B and 402C. Similarly, the airline database 404 and clothing company database 406 include tables 404A, 404B, 404C, and 406A, 406B, 406C respectively. Every table within any one of the databases 402, 404, 406 has a counterpart table in the others. For example, if shoe company database 402 has a table 402B, which is a collection of contact information, there is a corresponding/counterpart collection of contact information tables 404B, 406B in each of the airline databases 404 and the clothing company database 406.

In an embodiment of the present invention, the identified counterpart tables 402B, 404B, 406B of each database 402, 404, 406 are able to communicate between one another and thereby provide shared access of their respective contents. This feature also applies to the other tables of the databases 402, 404, 406. For example, shoe company table 402C may communicate with, provide a reference to, request data, or store data, in airline table 404 C, as represented by the communication link 408. Similarly, shoe company table 402C may be linked to clothing company table 406C utilizing communication link 412. The airline table 404C is likewise linked to the clothing company table 406 via link 410. Each of the links 408, 410, 412 provides bidirectional communication.

Turning to FIG. 4B, in order to facilitate the link and communication among the tables as described, the present invention implements a schema that allows the identification of particular content as shareable. This feature also addresses issues of privacy or corporate confidentiality of certain information items. The schema is best described with reference to FIG. 4B, in which the details of an exemplary table that may be utilized to achieve the objectives of the present invention is illustrated.

In order to provide sharing of the information from the contact information table 404B of the airline database 402, the contact information table 404B is structured to allow and track record level sharing of information items. As illustrated in FIG. 4B, the contact information table 404B is defined with a number of contact fields 414. The contact fields 414 include an Identification 418, Name 420, Email 422, Share_flag 424 and Share_Count 426. Data values corresponding to the contact fields 414 are provided for multiple contact records 416a, 416b . . . 416f, collectively referenced as contact records 416. Each of the records 416 may be shared on an individual basis, thus allowing or disallowing access from a non-airline source including databases or cloned applications, such as the shoe company database 402 or the clothing company application 306.

To illustrate, consider record 416a of the contact information table 404B. The Identification field 418 provides a unique identifier for each record in the table 404B. The field Name 420 has an entry "John" that identifies the individual to whom the rest of the records pertain. Field email 422 would contain the email address for "John". The Share_flag 424 contains an indicator—"yes", that signals whether the information contained in record 416a can be shared with other non-airline sources. It should be understood that while the share_flag 424 is illustrated as having Boolean type entries—YES/NO, for an indicator, the field may also be defined to have integer valued entries which may signal different share permission levels or characteristics. The Share_count 426 contains a value "0", representing for example, the number of times (statistical use) the record 416A has been shared. Share_count 426 may also be used to maintain a count of concurrent sharing of the record 416a. Accordingly for example, record 416b pertaining to "Joe" is shareable and has been shared at least "7" times. Conversely records 416c and 416d pertaining to "Sarah" and "Bob" respectively are not shareable.

The record level sharing that is provided by the present invention enables control by the end-user of what data may be shared. For example, if the airline company elects not to share any information from its contact information table 404B, the airline may do so by setting the Share_flag 424 to a value of "No" or other appropriate indicia, for all records by default.

Alternatively, if the airline company elects to make its data available to other companies, it may do so by setting the Share_flag to the appropriate indicia, e.g. "Yes". When data is shared, the airline company, still has the ability to restrict the sharing of particular records 416, either because, for example, the individual patron has elected or requested to have their information kept private or because the airline company considers that particular record confidential.

As described in the previous model, cloned application programs 302, 304, 306 executing on the application server 104 communicate to retrieve or store data on the database server 108. In the Table Access Model of the present invention, this process essentially remains the same, with a slight variation in how information may be accessed or shared between the components of the cloned application programs 302, 304, 306. The specific communication paths and links are best described with reference to FIG. 5, which illustrates a block diagram and the various communication links that are available from the application server 104 to the database server 108. As shown, there is a shoe-data link 502, a shoe-airline link 504, a shoe-clothing link 506, an airline data link 508, an airline-shoe link 510, an airline-clothing link 512, a clothing data link 514, a clothing-shoe link 516 and a clothing-airline link 518.

Turning to FIG. 5 and specifically considering the shoe company application 302, the shoe_data link 502 represents a direct interchange of data between the shoe company application and the shoe database 402. The shoe-airline link 504 represents the ability for the shoe company application 302 to access the airline database 404, and the shoe-clothing link 506, represents access to the clothing company database 406. Reflecting back for a moment to the discussion relating to FIG. 4B, the individual tables and records of the databases 402, 404, 406 are designed to be shareable. For example, the airline's contact information table 404B had records 416 that may be individually flagged as shareable.

As seen in FIG. 5, the shoe company application 302 may access and utilize for example, the records of the airline's contact information table 404B, essentially as it would the shoe company's contact information table 402B. This is represented by the shoe-airline link 504. In fact, link 504 represents the fact that the shoe company application 302 may in effect access any one or more of the airline company records to the extent that the airline company or other persons having appropriate rights may designate. In a somewhat similar manner, the shoe company application 302 may also access and utilize the clothing company's records as represented by the shoe-clothing link 506. This same scenario holds true for the cloned airline application 304 and clone clothing company application 306. Any one of the cloned applications 302, 304, 306 is able to access and leverage the data records of the other within the constraints of privacy and confidentiality considerations.

The present invention has been described with respect to two embodiments of a sharing methodology. The invention is also described with some reference to a CRM implementation. As would be apparent from the review of the foregoing, the system and method of the present invention is applicable to other environments and implementations and provides a number of advantages. In order to further illustrate the advantages and facilitate an understanding of the present invention, a number of examples applicable to a CRM software are provided below. These examples also illustrate other applications for the present invention.

EXAMPLE 1

Searching Optimization and Enhancement

CRM systems usually incorporate a search engine to find documents stored in the customer service or sales knowledge bases. Commonly search engines include an optimization technique to reduce index sizes and speed searching by maintaining a list of 'stop words.' These stop words are language specific high frequency words that are so common they do not aid in differentiating search results. In English, articles such as 'an' and 'the' are examples of common stop words. Stop word lists are commonly manually maintained and updated, with some systems possibly suggesting stop words based off of the content visible to the search engine.

Using the inventive technique, two versions of the same search engine but serving different sites could share updates of stop word lists. Rather than a search engine for ice cream and a search engine for computer hardware, each maintaining a separate list of English common words, each local list could be synchronized to contain the updates manually entered into either. Alternatively, manually entered updates could be suggested as stoplist additions (which could be stored in a separate file such as a text file and not necessarily in a database) to administrators of other sites.

Another searching enhancement, based on manual entry or machine learning, is the provision of suggestions for searches related to a given search, especially if the given search returned few results. These related search suggestions could be learned more accurately by aggregating relations learned from multiple sites.

Another searching enhancement closely tied to machine learning is the automatic adjustment of the search results based on learned word relationships. Thus, when a searcher enters a search term and eventually selects a document to view, the entered search term is associated with the textual content of the selected document (even if there is no identical match between the search term and document). Unexpected but useful relationships can be discovered when multiple search queries are used before a document is selected. In this case the words from the first search query could relate to the documents selected in subsequent queries. These search term to text relationships could be shared across sites to generate a more general language model to make accurate searches.

EXAMPLE 2

Federated Search

Federated search is a term describing a single search interface that searches multiple data sources to produce a single result list. In a shared data environment, certain related data sources could be simultaneously searched from a single localized point. For example, when John Doe visits an online clothing retailer and searches on "outdoor gear" he would get results from the clothing retailer, but also results from the independent shoe retailer using the same internet sales software. Federated search results could be merged before presentation, or presented in a manner to distinguish the sources of the results.

EXAMPLE 3

Ontologies/Folksonomies

Ontologies are word relationships. These word relationships are used to improve searching accuracy, analytic evaluation and comparison of textual data, text clustering, cross-sell/up-sell recommendations, and many other tasks. Simple ontologies are synonym lists, but complex ontologies address all forms of word relationships including but not limited to, 'more specific/more general', 'example of', and 'same domain.'

Ontologies are difficult to generate and maintain. Traditional manual techniques are labor intensive to create, and require ongoing maintenance to keep current and reflect the richness of the domain. Automated techniques exist, but rely on large amounts of data and computation time. As in Example 1 on searching, the manual or automated improvement of an ontology in one implementation of an application can propagate to other implementations of the same application.

Folksonomies are similar to ontologies, but instead of attempting to glean universal word relationships, they allow individuals to label content with words that make sense to the individual. Then, with numerous examples of individually labeled content, the system can identify shared labels for consistent content. To the extent that these labels are the same, the more universal ontology could be assumed and extracted. Similarly, the various labels for the same content then form a type of ontology themselves.

In the shared system environment folksonomies become more robust since they have a larger pool of content from which to draw the relationships. Secondarily, once terminology is identified as common, it can be suggested as important for marketing applications.

EXAMPLE 4

Sharing Contacts

In a business-to-business sales arena, identifying the best individual contacts at a target company is a difficult process. In a typical sales automation application, such contact data can be shared among members of a sales team. There also exist commercial databases of corporate contacts to aid during the sales process. However, these external databases may be updated only periodically, and between updates the content may become outdated. In a cloned application environment, two or more individual companies can share their business contacts, resulting in a larger database than would be available to either company individually. This could be viewed as a federated search of multiple databases, as in Example 2. For example, in this scenario, a business wholesaling ice cream to companies has collected contacts in the various partner organizations. Now, when a computer hardware company desires to sell to one of the companies that the ice cream vendor has identified as a partner, the computer hardware vendor can use the contact that has been vetted by the ice cream wholesaler. The reverse scenario would also apply—when the ice cream vendor identifies a potential partner business, they can simply check the system to find shared data from the computer hardware vendor identifying appropriate contacts in the potential partner business.

In this case, each company has a private record of contacts that are identified in the system as various qualities from marketing leads, to sales prospects, to current customers. Each varying level has an associated quality level identified by the current system. When seeking a new contact, the system can query all clones of the application to identify the various identified contacts within a business, and similarly get an identifier about the quality of the suggested contacts.

The individual quality levels can relate to various attributes about the individual contact, including not only the name of their organization, but also their position in the organization, the phone number and email, and other relevant attributes.

Using the pay service, incentive and reputation model of data sharing, or the market mechanism, there are multiple methods exposed for the ice cream company to access the broader library of contacts available across the suite of installations of the software. First, each query for a contact may cost the ice cream company $1. Similarly, they may be granted 100 contact queries as part of a premium service. Alternatively, for each contact of their own that they choose to share, they may have access to another at no cost or discounted cost from the shared pool. Finally, each company could be tracked on the quality of the contacts they share. For each contact that contains current, accurate data, they are identified as a good neighbor, but for each contact that is out of date or inaccurate, they could be identified as a free-loader. Those who are net good neighbors might receive additional benefits, such as lower cost contact queries, while those who are identified as free-loaders may be required to pay more for their shared data access. The identification of contact quality may be embedded as part of the contact sharing process, namely a company that requests the contact has the ability to rate the quality (i.e., the accuracy and currency) of the contact. Similarly, this could be tracked without specific input by the system by identifying which shared contacts entered into the recipient's system move to the next stage in a sales cycle tracked by the system.

Also of note, each contact could have a pre-defined quality measure that is reported to the requester. This quality measure could come from the contributing company's reputation, it could come from the system itself (i.e., marketing leads are inherently lower quality than identified customers who have purchased a product), or it could come from a combination of these values.

EXAMPLE 5

Verticalized Implementation

In a self-service customer service arena of CRM software, each new installation of a customer service software system requires some level of customization to the particular business. For example, specific system configurations (as contained in database tables or in text files as mentioned above) for look and feel, certain content, and work-flow processes all must be adapted to the particular installation. There are various identifiable market segments interested in customer service, such as banking, airlines, consumer products, and many others. If, during implementation and customization of a new customer service software installation for an airline, the person performing the implementation task could query all previous installations of the same product for all other airlines, the commonalities could be identified and suggested to the implementation specialist. These airline-specific recommendations could speed the implementation process, improve the likelihood that the customization fits the business, and decrease the potential that a useful customization is overlooked.

EXAMPLE 6

Cross Selling

A common part of CRM software, manifesting in service, sales, and marketing, is a cross sell module. In a retail sales environment, the opportunity to target sales recommendations to individual consumers optimizes the sales process, resulting in higher sales rates.

Traditionally, these cross sell opportunities are driven by either explicitly created rule sets, or by automated analysis of buying patterns. In each of these cases, the larger the data set to work from, the more accurate the sales recommendations. By sharing customer demographics, buying patterns, and rule sets between companies, each company's product recommendation becomes more accurate. For example, if a shoe store records John Doe's purchase of hiking boots, when John Doe enters a clothing store, the clothing store can use his recent shoe purchase to recommend outdoor clothing. Then, when John Doe purchases an airline ticket to a remote area, an adventure tour company can contact John Doe about specific hiking tours available in the destination area. By extension, if the US Center for Disease Control also used the recommender, it could suggest to John Doe which vaccinations are appropriate for that adventure destination.

Such extended recommendations could be of two types. The first are recommendations based on the automated modeling or on the rules of a first organization, where the data referenced could originate from other organizations. For example, a marketer for a clothing store could create a rule recommending outdoor clothing for customers who have bought hiking boots at a shoe store. A second type of recommendation is third party recommendations. In this case, a customer at a first business could receive offers from a second business, where those offers were generated by the internal rules and models of the second business, and simply passed on for recommendation through the first business.

EXAMPLE 7

Staff Expertise Finding

CRM software is complex not just in functionality. Part of the complexity comes from managing information for both end-users as well as staff members. By analyzing sufficiently rich records of staff activity and social networks across implementations of the base application, it is possible to identify "communities of practice," sets of people having shared business goals and/or overlapping expertise.

For example, marketers specializing in a geographic region would tend to have common concerns and information needs, and might mutually benefit from consultations if they were aware of each other. Facilitating communication among members of such expert communities could be achieved by recommending them to each other.

Similar to Example 4's approach to sharing contacts, staff information can either be included with contact information, or it may be analyzed separately. Should staff be treated as a separate entity from contact information it could be used in a number of ways: it could be used for expertise identification, it could be used for staffing predictions, it could be used for workload analysis, or any number of other tasks.

Expertise analysis could help identify business partners. Staffing predictions could come from analyzing a business vertical to identify the number of staff in each focused area needed to work on a specified number of items. Workload analysis could suggest points for efficiency improvement by comparing industry-wide trends, i.e., the industry-wide trend is for Tier-1 support representatives to work 20 trouble tickets per day, with an average call time of 12 minutes and this business' Tier-1 group works 25 trouble tickets per day, with an average call time of 15 minutes, which is 17% worse lower than expected.

EXAMPLE 8

Predicted Partnerships

Often overlooked in CRM sales modules is the ability to identify business partners. One difficult aspect of growing a business is identifying strategic partnerships. Good partners would be those companies that are not competitors, but who share business goals. Many businesses use customer relationships management (CRM) software to aid their business operations. CRM commonly includes sales automation systems, customer service systems, and marketing automation systems. By sharing selected information among numerous CRM systems, each CRM system can recommend potential business partners. Relevant information that may be shared include staff expertise, product offerings, customers, and marketing campaigns. The system can then identify complementary staff abilities, complementary product offerings, shared customers, and related marketing campaigns and use this suite to recommend a partnership.

EXAMPLE 9

Document Templates

The marketing component of a CRM application relies on creating and tracking marketing campaigns. The creation of a marketing campaign relies heavily on generating campaign templates that are reused throughout the campaign. These templates commonly contain abstracted areas, such as FIRST-NAME, which are filled in from the database of people who will receive the campaign. These campaign templates could, with appropriate anonymization, be shared to all users of the marketing software. This sharing would speed development time for new marketing campaigns.

Desktop software applications commonly include a suite of document templates and clip-art. Advanced users of these applications sometimes create their own document templates and clip-art. In a shared system environment, once someone adds a document template to the system, it is available as part of the template library for all systems. Also, in the area of custom analytics, customer reports constructed by one company could be made available to other companies to use on their own data resulting in a type of report template and the functionality to create a company specific customer report.

EXAMPLE 10

Survey Data

Tools exist to survey people about various opinions, such as customer service experiences, and product usage polls in a CRM service or marketing scenario. In a distributed environment of survey software, the results of surveys could be generalized to other systems. Hence, individual market trends or geographical trends could be made available to all survey tools as extracted and aggregated from each survey tool.

Similar to the Document Templates Example 9, each produced survey could be considered a template for sharing by others. In this implementation, each survey question in a shared template could report statistics on the likelihood it is answered, the inherent bias of the question, and numerous other attributes. Groups of questions can also report statistics on response rates and trends as well. In this example, a template containing 12 questions might have a universal response rate of 80%, the first question in the template is answered 90% of the time, and there is a negative bias to the response on this question.

EXAMPLE 11

Data Cleaning/Personal Portal

Any application that imports customer data, such as sales and marketing automation components of CRM software, must have processes to determine if the customer data is accurate and updated, and not already in the system. In a related process to that described in contact sharing Example 4, the import of customer information can be checked against the data that exists in other systems. When a match is found, depending on the identified quality of the customer record in the system, the imported data is reconciled with existing data so that all systems can have a copy of the most current information.

An alternate implementation of this process would be when the customer accesses and updates information on any of the systems, that customer record is propagated to all systems. Here a customer can manage a change of address on one system and the results are instantly available on all systems the customer has ever interacted with. Thus, John Doe might perform the address change at the clothing store, but that change is reflected at the shoe store, the airline, the travel company, etc. In addition to contact information, the customer could change contact profiles, or any other type of information that might be collected on a given site (such as folksonomy type descriptors, etc).

EXAMPLE 12

Fraud Detection

Companies selling products occasionally encounter the problem of fraud. Fraud detection approaches exist within individual financial services domains, but rarely are available at the level of the seller. This is because accurately detecting fraudulent behavior requires visibility into larger patterns of behavior than purchases at a single company. Using techniques similar to the Cross Selling in Example 6, abnormal patterns can be detected. If, for example, a customer universally purchases inexpensive male outdoor gear, spread across a variety of stores (all using the same software sales system), but is at yet another unrelated store (which uses the same system) attempting to purchase expensive female fashion items, the system can suggest that additional verification is advisable before completing the sale.

EXAMPLE 13

Personnel Management

While sometimes seen as unrelated to CRM software, job application software is closely related to customer service software. In this example, the job applicant is the customer, and their resume submission is akin to a service trouble ticket. Job application software is usually available on a corporation by corporation (or division by division) basis. In a shared data model, a job applicant to one corporation or division could be mirrored to other corporations or divisions depending on desire by either the applicant or the recipient. And, similar to the Contact Example 4, when a job applicant enters contact information on one site, that content can be mirrored and updated on all shared data sites.

Several additional areas of software products are directed towards personnel management, from salary and accounting packages to job recruiting to job application packages, and many more. In the salary tracking and accounting area, one task that is commonly performed is a salary review. During the salary review process a list of employees' salaries is compared against regional and national averages. This comparison list is usually purchased independent of the employee accounting package. However, in a shared data software environment that salary information can be collected from all implementations of the system.

EXAMPLE 14

Economic Trends

Businesses, regardless of the quality of their offerings, are subject to wider economic trends. These trends could be global in nature, or they may be localized to a particular business vertical segment, such as computer hard drives (or, perhaps, computer peripherals, computer technology, or technology in general). A sales automation system is used by many businesses to aid their sales staff in selling, and aid the managerial staff in tracking and predicting performance. Integrating numerous sales automation systems to share an economic picture would allow sales staff and managers to adjust expectations appropriately. Thus, if there is a global economic downturn as tracked through decreased sales in all instances of the sales force automation tool, then the computer hard drive maker might lower sales expectations for the current sales cycle. However, if other computer hardware vendors are seeing an increase in sales, the hard drive manufacturer might increase the expectations for sales during the current cycle. This functionality could come from sharing the summarized trends for each sales system, not necessarily the literal sales data.

Without much modification, the above example could be generalized to manufacturing adaptation as well. Increasing or decreasing production of items could be suggested by the global or vertical performance during that cycle.

EXAMPLE 15

General Customer Buying Trends/Market Research

As a variant to identifying Market Trends in Example 14 combined with Cross Selling in Example 6, a shared data system could identify general or targeted customer buying trends and perform market research. Thus, CRM systems could clearly identify profitable customers by tracking universal purchases, number of support incidents, and likelihood to respond to a marketing item. Similarly, it would be clear that the system could track the decrease in popularity of outdoor items and the increase in popularity of personal care products. These buying and market trends could then help identify key customers to market to, key product lines to add or drop, and whether to adjust inventory levels on certain items through price incentives or manufacturing changes.

From the foregoing, it will be seen that this invention is one well adapted to attain all the ends and objects hereinabove set forth together with other advantages which are obvious and which are inherent to the system and methodology. It will be understood that certain features and sub combinations are of utility and may be employed without reference to other features and sub combinations. This is contemplated by and is within the scope of the claims. Since many possible embodiments of the invention may be made without departing from the scope thereof, it is also to be understood that all matters herein set forth or shown in the accompanying drawings are to be interpreted as illustrative and not limiting.

The methods and systems described above and illustrated in the drawings are presented by way of example only and are not intended to limit the concepts and principles of the present invention. As used herein, the terms "having" and/or "including" and other terms of inclusion are terms indicative of inclusion rather than requirement.

What is claimed is:

1. A method for providing selective private data sharing between at least two different tenant implementations of a software program in a hosted, multi-tenant implementation of the software program, said method comprising:

providing, by a computer system, a first-implementation of the software program to a first tenant and a second implementation of the software program to a second tenant, said first implementation having a first data store including a first set of private business data for a first business entity, and said second implementation having a second data store including a second set of private business data for a second business entity, wherein said private business data is data that is not publicly available outside of the first business entity or second business entity, and wherein the first business entity and the second business entity are different entities;

identifying, by the computer system, a shareable subset for each of said first and second data stores, said first and said second data stores are maintained according to a common schema and the shareable subsets are identified based at least in part based on the common schema;

anonymizing, by the computer system, the sharable subset for each of said first and second data stores;

providing, by the computer system, access by either of said first and said second implementations to said anonymized shareable subsets of said first and second data stores, whereby said first implementation is capable of transparently utilizing said second set of private business data during processing and said second implementation is capable of transparently utilizing said first set of private business data during processing based on the anonymized shareable subsets of said first and second data stores; and tracking, by the computer system, a statistical use of shared data between said sharable subsets.

2. The method of claim 1 further comprising:
requesting, by the computer system, in said first implementation one or more informational items from the private business data;
determining, by the computer system, if said one or more informational items is one of said shareable subsets; and
providing, by the computer system, said one or more informational items to said first implementation from said second data store.

3. The method of claim 1 further comprising:
storing, by the computer system, in said first implementation one or more informational items from the private business data to said first data store;
determining, by the computer system, if said one or more informational items is one of said shareable subsets; and
updating, by the computer system, said second data store with said one or more private informational items.

4. The method of claim 1 wherein providing access to said shareable subsets provides access to one or more tables within said data store of said first implementation by said second implementation.

5. The method of claim 1 wherein said providing the first-implementation of the software program to the first tenant and the second implementation of the software program to the second tenant includes hosting said first and second implementations.

6. The method of claim 1 further comprising:
utilizing, by the computer system, said shareable subsets to create survey data.

7. The method of claim 1 further comprising:
utilizing, by the computer system, said shareable subsets to predict economic trends.

8. The method as in claim 1 wherein said access is provided to one or more users of said software program.

9. A non-transitory computer readable storage device having stored thereon a computer program for implementing a method of providing selective private data sharing between at least two different tenant implementations of a software program in a hosted, multi-tenant implementation of the software program, the method comprising:

hosting in a computing environment, a first implementation of the software program to a first tenant and a second implementation of the software program to a second tenant, said first implementation having a first data store including a first set of private business data for a first-business entity, and said second implementation having a second data store including a second set of private business data for a second business entity, wherein said private business data is data that is not publicly available outside of the first business entity or second business entity, and wherein the first business entity and the second business entity are different entities;

identifying a shareable subset for each of said first and second data stores, wherein said first and said second data stores are maintained according to a common schema and the shareable subsets are identified based at least in part based on the common schema;

anonymizing the sharable subset for each of the first and second data stores;

providing access by either of said first and said second implementations to said anonymized shareable subsets of said first and second data stores whereby said first implementation may transparently utilize said second set of business data during processing and said second implementation may transparently utilize said first set of business data during processing based on the anonymized shareable subsets of said first and second data stores; and tracking a statistical use of shared data between said sharable subsets.

10. The non-transitory computer readable storage device of claim 9 having the implemented method further comprising:
requesting in said first implementation one or more informational items from the private business data;
determining if said one or more informational items is one of said shareable subsets; and
providing said one or more informational items to said first implementation from said second data store.

11. The non-transitory computer readable storage device of claim 9 having the implemented method further comprising:
storing in said first implementation one or more informational items from the private business data to said first data store;

determining if said one or more informational items is one of said shareable subsets; and updating said second data store with said one or more informational items.

12. The non-transitory computer readable storage device of claim 9 having the implemented method wherein providing access to said shareable subsets, provides access to one or more tables within said data store of said first implementation, by said second implementation.

13. The non-transitory computer readable storage device of claim 9 having the implemented method further comprising:

utilizing said shareable subsets to create survey data.

14. The non-transitory computer readable storage device of claim 9 having the implemented method further comprising:

utilizing said shareable subsets to predict economic trends.

15. The non-transitory computer readable storage device of claim 9 wherein said access is provided to one or more users of said software program.

16. A system comprising:

a processor; and a memory coupled with and readable by the processor and having stored therein a set of instructions which, when executed by the processor, cause the processor to provide selective private data sharing between at least two different tenant implementations of a software program in a hosted, multi-tenant implementation of the software program by:

providing a first-implementation of the software program to a first tenant and a second implementation of the software program to a second tenant, said first implementation having a first data store including a first set of private business data for a first business entity, and said second implementation having a second data store including a second set of private business data for a second business entity, wherein said private business data is data that is not publicly available outside of the first business entity or second business entity, and wherein the first business entity and the second business entity are different entities;

identifying a shareable subset for each of said first and second data stores, wherein said first and said second data stores are maintained according to a common schema and the shareable subsets are identified based at least in part based on the common schema;

anonymizing the sharable subset for each of said first and second data stores;

providing access by either of said first and said second implementations to said anonymized shareable subsets of said first and second data stores, whereby said first implementation is capable of transparently utilizing said second set of private business data during processing and said second implementation is capable of transparently utilizing said first set of private business data during processing based on the anonymized shareable subsets of said first and second data stores; and tracking a statistical use of shared data between said sharable subsets.

17. The system of claim 16 further comprising:

requesting in said first implementation one or more informational items from the private business data;

determining if said one or more informational items is one of said shareable subsets; and providing said one or more informational items to said first implementation from said second data store.

18. The system of claim 16 further comprising:

storing in said first implementation one or more informational items from the private business data to said first data store;

determining if said one or more informational items is one of said shareable subsets; and updating said second data store with said one or more private informational items.

19. The system of claim 16 wherein providing access to said shareable subsets provides access to one or more tables within said data store of said first implementation by said second implementation.

20. The system of claim 16 wherein said providing the first-implementation of the software program to the first tenant and the second implementation of the software program to the second tenant includes hosting said first and second implementations.

21. The system of claim 16 further comprising utilizing said shareable subsets to create survey data.

22. The system of claim 16 further comprising utilizing said shareable subsets to predict economic trends.

23. The system as in claim 16 wherein said access is provided to one or more users of said software program.

* * * * *